United States Patent [19]
Blanshine et al.

[11] 3,901,007
[45] Aug. 26, 1975

[54] HAY ROLL FORMING MACHINE

[75] Inventors: Allison W. Blanshine, Lititz; Jack W. Crane, New Holland, both of Pa.

[73] Assignee: Sperry Rand Corporation, New Holland, Pa.

[22] Filed: June 12, 1974

[21] Appl. No.: 478,500

Related U.S. Application Data

[63] Continuation-in-part of Ser. No. 353,941, April 24, 1973, abandoned.

[52] U.S. Cl. .................................. 56/341; 100/88
[51] Int. Cl.² ........................................ A01D 39/00
[58] Field of Search ................. 56/341–343; 100/88

[56] References Cited
UNITED STATES PATENTS

| | | | |
|---|---|---|---|
| 3,110,145 | 11/1963 | Avery | 56/1 |
| 3,722,197 | 3/1973 | Vermeer | 56/341 |
| 3,815,345 | 4/1973 | Mast et al. | 56/341 |

*Primary Examiner*—Russell R. Kinsey
*Attorney, Agent, or Firm*—John R. Flanagan; Frank A. Seemar; Joseph A. Brown

[57] ABSTRACT

A machine to form compact rolls of hay of substantial size by picking up a swath or windrow of hay and the like from a field, engage it by cooperating upper and lower endless flexible aprons driven in suitable directions and at suitable relative speeds to coil the hay into a compact roll while supported upon floor means mounted stationarily in the bottom of the machine to effect baling of the hay without any appreciable loss upon the ground. The lower apron moves longitudinally along said floor and when the roll type bale of hay reaches a predetermined diameter, the upper apron raises, which stops driving the same, to provide an exit through which the lower apron assists in ejecting the bale onto the ground. The upper apron comprises transverse bars which aggressively engage the upper part of the roll and compresses it in a manner to provide substantially uniform density throughout. The relative speeds at which the lower apron and upper apron are driven is variably adjustable to produce different characteristics in the density of the roll of material produced by the machine and also effect other operational characteristics.

18 Claims, 18 Drawing Figures

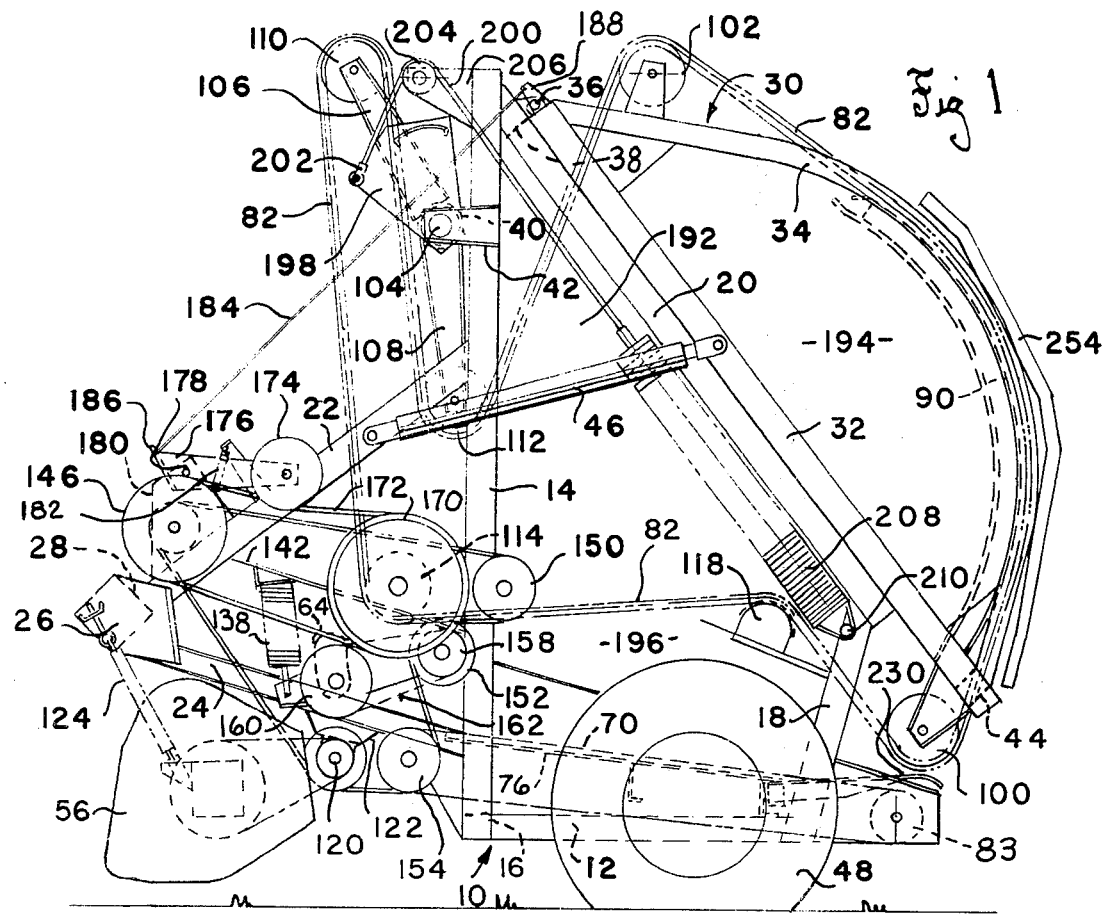
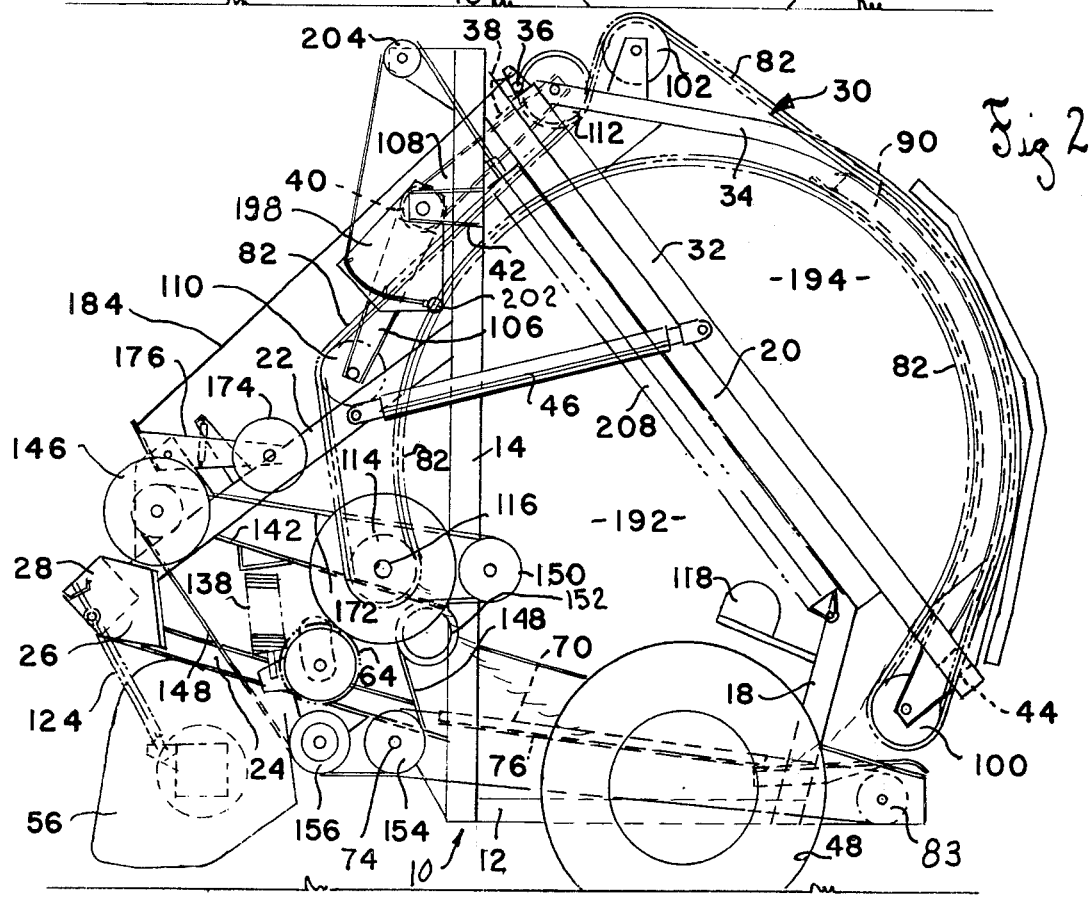

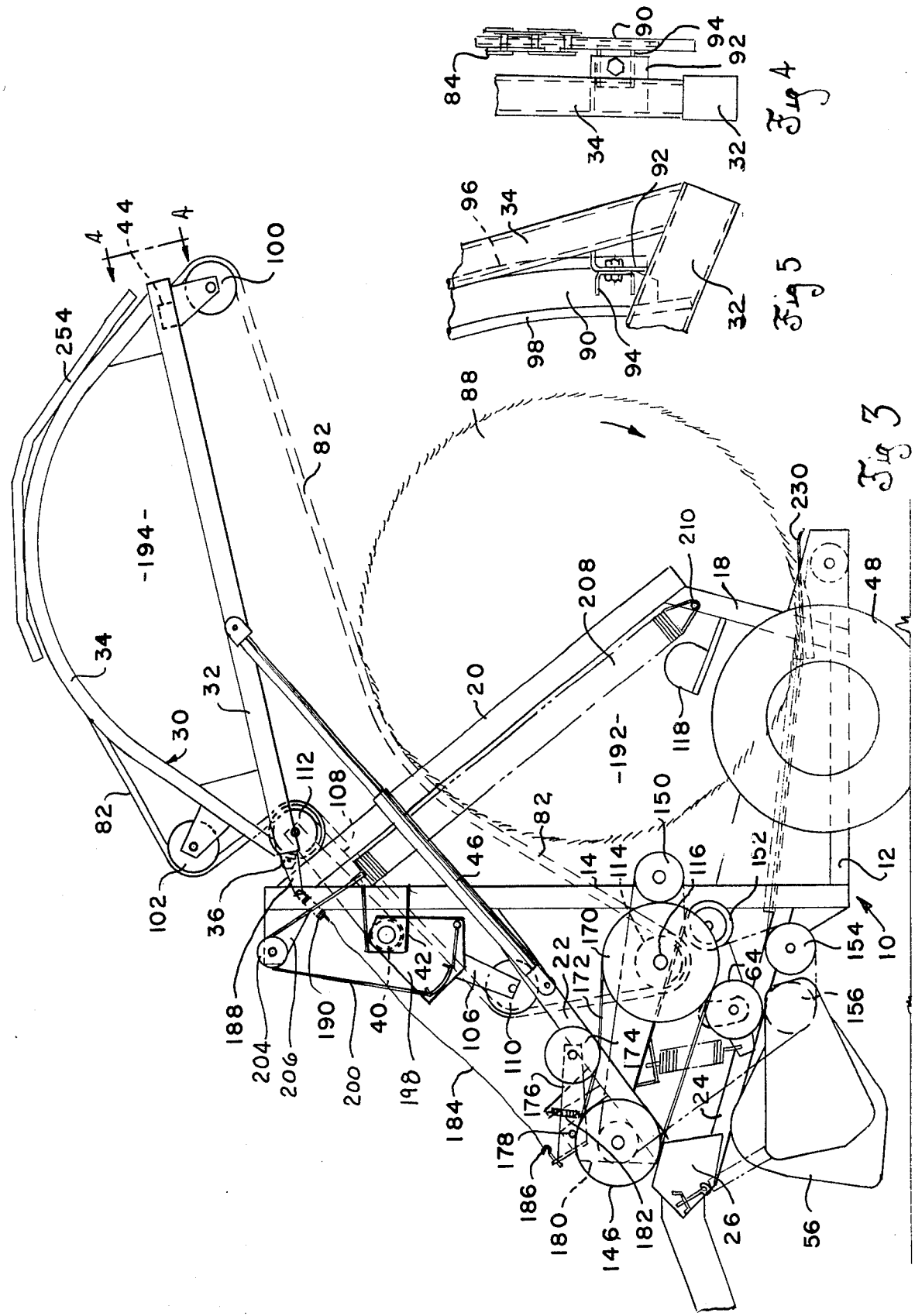

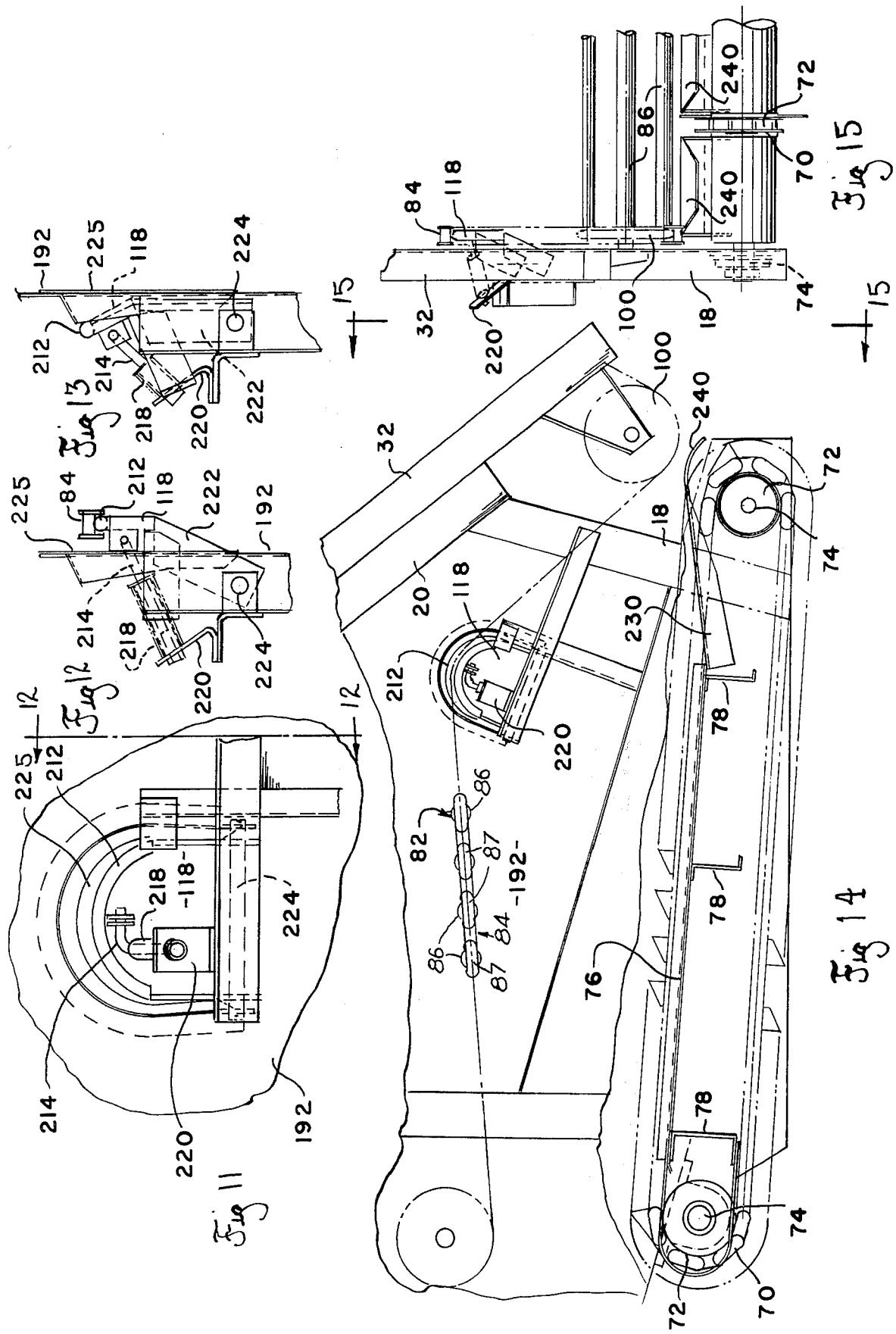

HAY ROLL FORMING MACHINE

BACKGROUND OF THE INVENTION

This application is a Continuation-In-Part of Ser. No. 353,941, filed Apr. 24, 1973 and now abandoned.

For many years, it has been customary to harvest forage crops, such as various kinds of hay and leaf type forage plants by moving the same in a field, letting them lie for several days to dry, forming the cut and at least partially dryed crop into windrows, and passing a hay-baling machine over and along such windrows to form the crop into rectangular bales which are secured by passing one or more tying strands around the bale. The bales then are picked up by various means and are taken to a barn or shed in which piles of such bales are stored until used. In recent years, it has been found that if hay and similar forage crops are formed into a compactly coiled roll by various types of machines, the cylindrical formation of the roll thus produced tends to provide self-shedding of rain and other inclement weather substances if the roll is left lying in a field or feed lot where cattle and other herbivorous animals may feed upon it, without requiring the roll to be taken to a storage shed.

Large rolls of forage crops of the type described frequently are of the order of 4 or 5 feet in diameter and 6 or 8 feet long. Rolls of this size may weigh as much as several tons. If they are to be moved, following the formation thereof, special types of equipment must be used.

Forming compact, large rolls of hay has engaged the attention of various inventors heretofore. Several different principles have been utilized in the resulting inventions. One type forms a roll or coil of hay and the like by initiating the formation of such roll by suitable mechanism and continue to roll a swath or windrow of the hay while supported upon the ground. Examples of such mechanisms are shown in prior U.S. Pat. No. 3,110,145, to Avery, dated Nov. 12, 1963. Another such machine comprises the subject matter of U.S. Pat. No. 3,650,100, to Swan, dated Mar. 21, 1972. One of the principle difficulties resulting from this method of forming rolls of hay is that a certain amount of the hay remains upon the field without being included in the roll of hay, such as the fines. Further, dirt, clods of earth, stones and the like also can be picked up by the roll and this is undesirable under certain circumstances.

A second principal method of forming rolls of the type referred to comprises a machine in which a swath or windrow of the crop is picked up from the field and directed onto a supporting conveyor or the like while the same is formed into a coil or roll of the forage crop and is out of contact with the ground, thus resulting in the formation of a cleaner type of roll or coil of hay, as well as the same including most of the normal fines of the crop, thus minimizing waste. One example of a prior machine for forming a coil or roll of hay is illustrated in U.S. Pat. No. 3,665,690, to Wenger, dated May 30, 1972. The particular design of the machine shown in said patent offers a certain amount of friction between the roll and the supporting frame of the machine, which is undesirable, and another undesirable feature is that the coil of hay is formed upon a core member rather than being a free-form of roll which has no core or mandrel and, in general, the coiled rolls are too dense in the inner core portions.

An even more recent U.S. Pat. No. 3,722,197 to Vermeer, issued Mar. 27, 1973, discloses a machine to form crop material into coiled rolls by employing a lower belt conveyor comprising a series of belts of textile-type material spaced transversely apart between opposite sides of the machine. An upper set of belts which also are spaced apart between opposite sides of the machine are supported for arrangement between an initial contracted configuration and an expanded operative position, the belts in the expanded position extending around the upper portion of the roll of crop material, and hydraulic means exert predetermined, fixed pressure upon said belts while expanding. However such pressure does not increase as the size of the roll increases, but remains constant, whereby as the circumference of the roll increases, the unit pressure areawise upon the roll decreases and results in less density in the outer portions of the final roll of product. Also, the belts of both kinds stretch during use and require tightening from time to time. Further the belts run in the same directions as the roll rotates and do not provide as much frictional engagement with the roll as other means would afford to prevent slippage between the belts and the roll.

A number of other patents exist which disclose machines designed to form rolls of cotton, sod and the like in which upper and lower endless belts or aprons are arranged to engage the material to coil it into a roll. In general however the nature of the aprons or the relative location and function, as well as the structure thereof do not adapt them to be employed efficiently and with minimum power consumption to form large rolls of agricultural crop material such as hay, which in general may each weight 1,500 lbs. or more. Such U.S. Pat. Nos. for example, include 50, to Kelsey and Potter, dated 1842; 3,164,211 to Scott, dated 1965; 3,230,866 to Branders et al, dated 1966; and 3,680,296 to Beebout, dated 1972.

The objectionable features and shortcomings of the prior patents referred to above and other collateral prior art are oviated in the design of machine comprising the present invention and a substantial number of improvements in the art of forming large sized compact rolls of hay and other forage crops are provided in said machine, details of which are as follows.

SUMMARY OF THE INVENTION

It is the principle object of the present invention to provide a machine for forming a compact roll of hay or similar forage material of substantial diameter and length by providing means to pick up a swath or windrow of such material by suitable means and feed it to a space between a flexible, endless lower apron movable relative to a bottom panel or floor which is mounted stationarily in the lower portion of the machine, and the lower course of an upper flexible apron in a manner to initiate the formation of a coil of said forage crop and continue to rotate and coil the same by rearward movement of the upper course of the lower apron and forward movement of the lower course of the upper apron, the upper apron comprising a series of transverse bars spaced apart for positive frictional engagement with the upper surface of the roll and provide substantially even application of pressure thereon across the entire length of the roll, and bars extending between endless flexible members supported by and guided around a series of rotatable idlers in such manner that the upper course of the upper apron is circuitously disposed, initially, at least partially within the space in the machine within which the roll of hay or other crop gradually expands in size, and said lower apron comprising a series of parallel endless flexible members which extend longitudinally in the machine and are spaced apart transversely relative to said floor, said members have lugs thereon to positively and aggressively engage the lower surface of a roll of hay to an even greater extent than the bars of the upper apron exert and thereby insure and facilitating effective rotation of said roll of hay within the machine and while the roll is out of contact with a field surface, as well as circumferentially orient the fibers and stems of the forage crop within the coiled rolls.

It is another object of the invention to form the endless flexible members of the lower apron by employing a series of endless chains spaced apart even distances transversely and supported preferably in guide channels on a substantially rigid planor floor or bed in the machine which is lowermost therein, said chains being guided around appropriate sprockets and the lugs on said chains engaging the lower surface of the roll of crop material, as it is rotated within the machine and constantly increases in diameter due to the rearward movement of the upper courses of said chains at a suitable selected speed relative to that of the lower course of the upper apron which moves forwardly in engagement with the upper portion of said roll of material, for purposes of not only causing the initial formation of the roll of hay but also controlling the density of the coiled roll as well as moving it away from the front end of the machine and within a roll rotating region therein.

It is another object of the invention to provide the machine with a base frame composed of rigidly connected structural members and adapted to support a floor or bed of the machine upon which a roll of forage material is supported while being formed, said frame having suitable wheels mounted thereon at opposite sides to render the machine mobile and adapted to be pulled along a field by a tractor or other suitable means which also provide a power take-off (P.T.O.) for purposes of providing power means to drive both the lower apron associated with said floor or bed, and the upper apron which comprises a pair of endless flexible chains between which said transverse bars extend, but said speeds being selectively variable to move the opposite courses or flights of said lower and upper aprons either at different speeds or substantially equal speeds and thereby control the density of the coiled roll of material as well as effect the power requirements and determine the position of the roll in the machine as it is formed and also the discharge action of the machine upon the roll.

Ancillary to the forging object, it is another object of the invention to effect the desired relative speeds of the upper and lower aprons by selecting appropriate sizes of driving sprocket gears by which they are driven and mount the same in operative positions within the machine.

The improved features for a hay roll forming machine which comprise the present invention are part of a complete machine which has other novel and patentable features from those of the present invention which also are included in the machine and comprise the subject matter of other related applications of which the inventors of the instant invention, or others are the inventors. For purposes of providing a full understanding of the details and function of the present invention, however, a complete machine to which the present invention pertains is illustrated in the drawings and described hereinafter and in which the present invention is particularly shown and pointed out appropriately.

Details of the foregoing objects and of the invention, as well as other objects thereof, are setforth in the following specification and illustrated in the accompanying drawings comprising apart thereof.

BRIEF DESCRIPTION OF THE DRAWINGS

FIG. 1 is a side elevation of a hay roll forming machine embodying the principles of the present invention and showing the various parts thereof in the position thereof for starting the formation of a hay roll, the upper apron being illustrated in compact or contracted position.

FIG. 2 is a view similar to FIG. 1 but showing the parts of the machine positioned substantially at the conclusion of forming a maximum size of hay roll.

FIG. 3 is a side elevation of the machine with the parts thereof illustrated in discharge position.

FIG. 4 is a fragmentary end view of a portion of the machine as seen on the line 4—4 of FIG. 3.

FIG. 5 is a fragmentary side elevation of the portion of the machine shown in FIG. 4.

FIG. 11 is a fragmentary side elevation on a larger scale than in FIG. 1–3 and showing supplemental guide means for the upper apron.

FIG. 12 is a fragmentary end view of the detail of the machine shown in FIG. 11 as seen on the line 12—12 thereof, said figure also illustrating portions of the mechanism in normal, operative position.

FIG. 13 is a view similar to FIG. 12 but showing said portions of the machine in released, inoperative position.

FIG. 14 is a fragmentary, partially diagrammatic view illustrating the function of the portion of the machine shown in FIGS. 11–13 in association with the floor or bed of the machine and the lower apron thereon.

FIG. 15 is a fragmentary end view of the portion of the machine shown in FIG. 14 as seen on the line 15—15 thereof.

DETAILED DESCRIPTION

Figure 6:
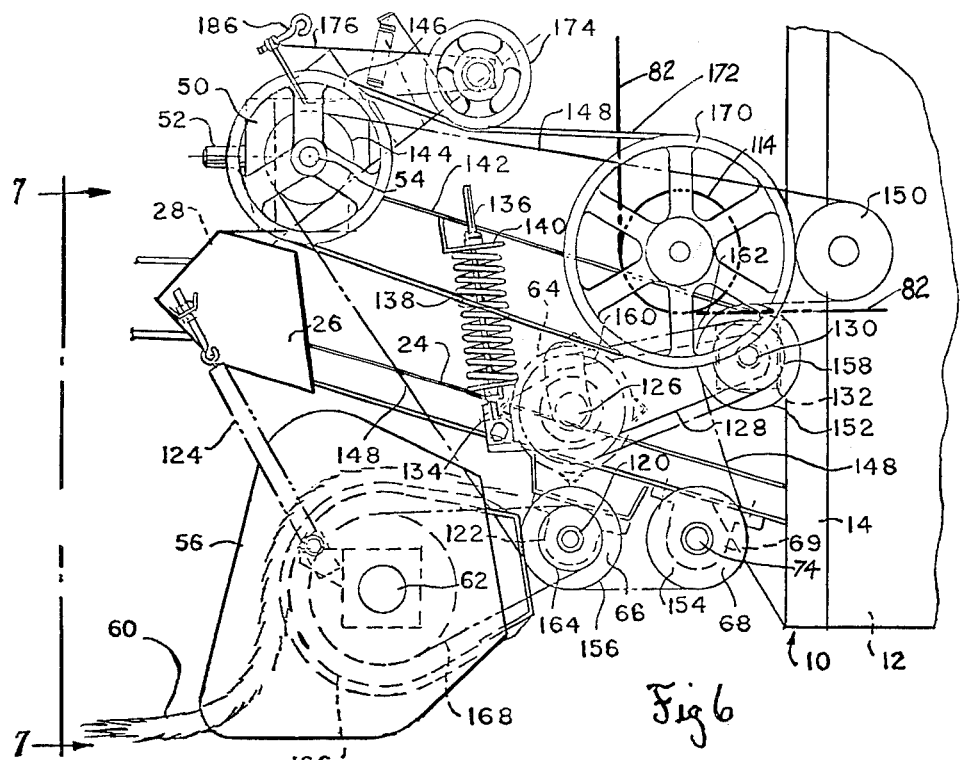
FIG. 6 is a fragmentary side elevation showing, on a scale larger than in the preceding figures, portions of the drive mechanism and control means incorporated therewith.

Referring to FIGS. 1–3, the machine illustrated therein comprises a base frame 10 which has similar side arrangements of structural members fixedly connected together, such as by welding or the like. Each side of said frame comprises a bottom horizontal member 12. The forward end thereof is connected to a vertical member 14 of substantial height. Also, extending perpendicularly to the junction of members 12 and 14 is a cross member 16, the adjacent end of which is fixedly connected to the junction of members 12 and 14. A short frame member 18 extends upwardly from the rearward portion of bottom member 12 and the upper end thereof is connected to one end of an upwardly and forwardly extending angular brace member 20 which is connected at it's upper end to the upper end of vertical member 14. Extending forwardly from the front face of member 14 at each side of the machine is an A-frame consisting of angularly related members 22 and 24, the rearward ends of which are fixed to the front face of vertical member 14 and the forward ends thereof are connected together and also are attached to polygonal plates 26, said plates also being fixed to and covering the outer ends of a horizontal cross member 28. The various frame members thus far described, which comprise the base frame 10, may be formed from heavy structural tubing, channels, or any other appropriate structural form commonly employed in framing of the type described.

An auxiliary or upper frame 30 also is provided which consists of side frames composed of a straight frame member 32, the ends of which are connected to the opposite ends of an arcuate frame member 34. The uppermost portion of each side frame member is pivotally connected at 36 to a suitable bearing fixed to the upper end of vertical frame member 14 of the base frame, as clearly shown in FIGS. 1–3. A suitable cross frame member 38 also extends between the upper ends of angular brace members 20 of frame 10 and thereby stabilize the connection of the upper frame 30 at opposite sides thereof by the pivotal connections 36 to the uppermost end of the base frame 10. The upper end of base frame 10 also is further stabilized transversely by means of another cross tube 40, or similar horizontal bracing member which extends between bearing brackets 42 which are connected to the front faces of the vertical frame members 14 such as by welding.

The lower rearward end of upper frame 30, as viewed in FIGS. 1 and 2, also has a cross frame member 44 extending between the opposite side frame means composed of members 32 and 34.

Upper frame 30 is moved between it's lower, operative position such as shown in FIGS. 1 and 2, and it's extended, or discharge position, as shown in FIG. 3, by means of a pair of hydraulic cylinder and piston units 46, the opposite ends of which respectively are connected to the members 22 and 32 of base frame 10 and upper frame 30, intermediately of the ends thereof, as shown in FIGS. 1–3. Suitable hydraulic lines, of conventional type, not shown, are connected to opposite ends of the cylinder of each unit 46 and said units at opposite sides of the frame operate simultaneously under all circumstances.

As will be seen from FIGS. 1–3, the base frame 10 has a pair of conventional wheels 48 connected thereto at opposite sides of the frame, by any suitable axle means, not shown but of appropriate conventional type, in order that the hay roll forming machine comprising the present invention may be drawn by a tractor or other similar implement over a field for purposes of forming a roll of hay or similar forage material. Referring to FIG. 6, the forward end of the machine has an appropriate gear box 50 interconnected to suitable transverse supporting means, including the cross member 28 for example. The gear box has an imput shaft 52 which is connectable to the driven end of a power take-off (p.t.o.) provided on and extending rearwardly from a suitable tractor unit or equivalent power mechanism. A power output shaft 54 extends from the gear box 50 to one side of the machine as viewed in FIGS. 1–3 and 6.

Figure 7:
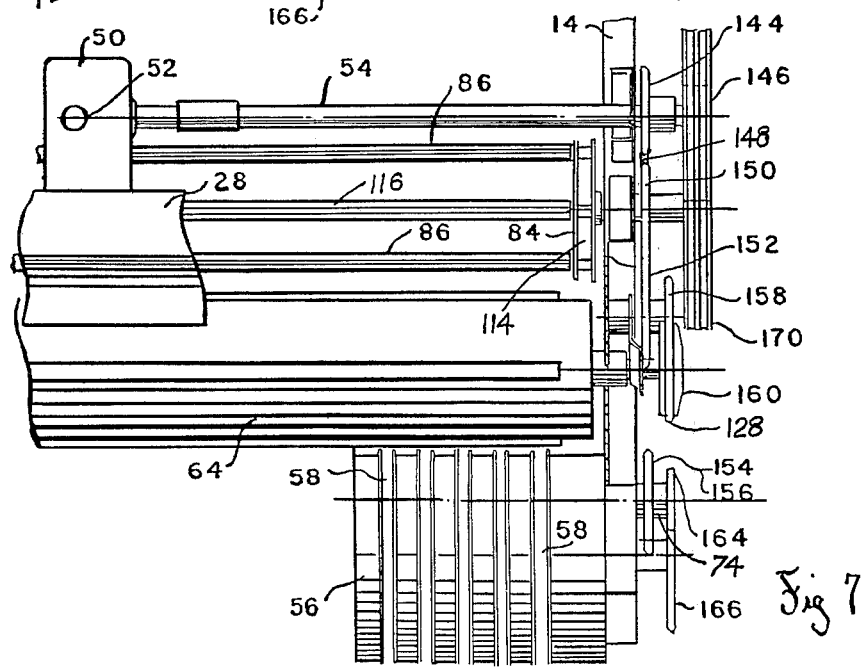
FIG. 7 is a fragmentary front view of the portion of the machine shown in FIG. 6.

Extending forwardly from the front end of base frame 10 is a pick-up header unit 56 of a type adapted to engage, from a field, elevate and rearwardly feed a swath or windrow of forage material which is in at least semi-dried condition. A fragmentary illustration of the forward portion of the header 56 is shown in FIG. 7. It comprises a drum having a series of transversely spaced, circular slots 58 therein, through which a series of spring fingers, not shown, but of conventional agricultural nature, extend for purposes of picking up a swath or windrow 60 of at least semi-dried forage material, as shown in FIG. 6, for purposes of moving the same to the entrance end of the machine. Said spring fingers are of the type shown in U.S. Pat. No. 2,581,542 to Kalzing, dated Jan. 8, 1952, for example, and are driven by a shaft 62, in clockwise direction, by means to be described, for purposes of elevating and feeding the material between a pair of compressing rollers 64 and 66, for purposes of leveling and preferably somewhat spreading transversely the swath or windrow which passes there between.

The flattened and somewhat spread material then passes to the entrance end of the lower apron which extends around driven roller 68, which is supported upon a shaft extending between bearings 69 respectively mounted upon the members 24 at opposite sides of the base frame 10, as clearly shown in FIG. 6. The compressing rollers 64 and 66 also are supported upon two transverse shafts, the opposite ends of which respectively are supported in suitable bearings which also are mounted upon the members 24 of the base frame at opposite sides of the machine, as best shown in FIG. 6.

Figure 16:
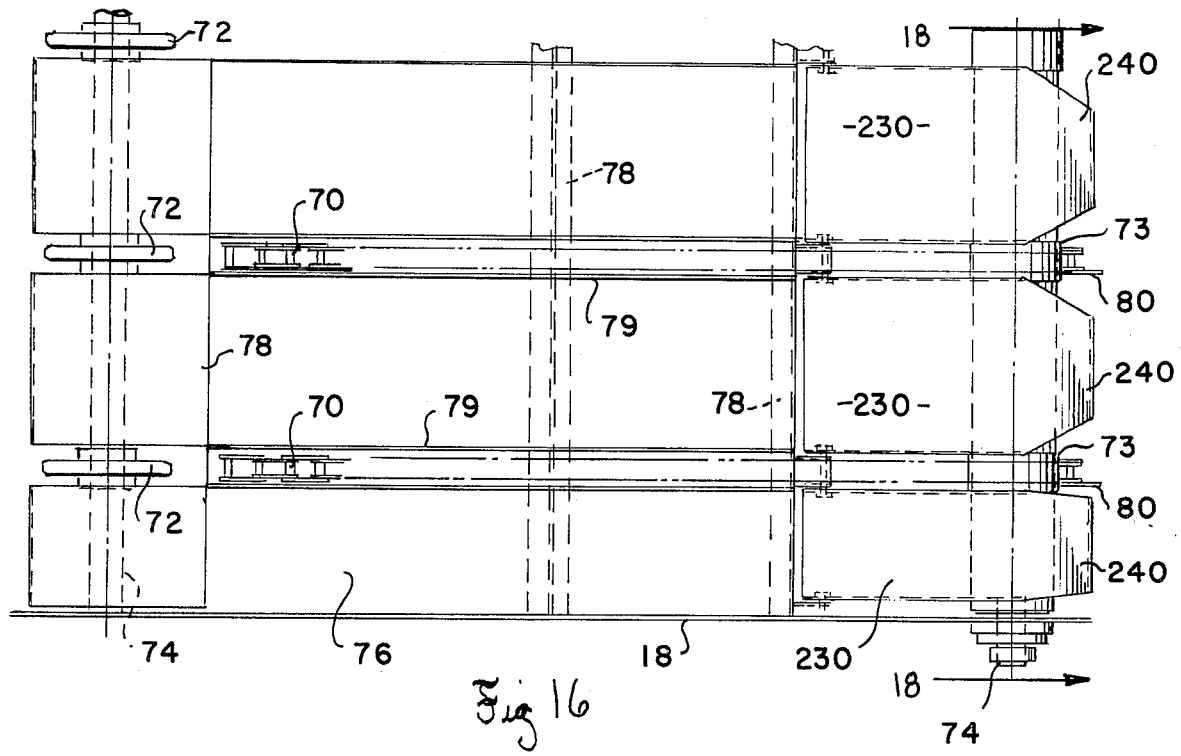
FIG. 16 is a fragmentary plan view of a portion of the floor and lower apron chains of the machine.
Figure 17:
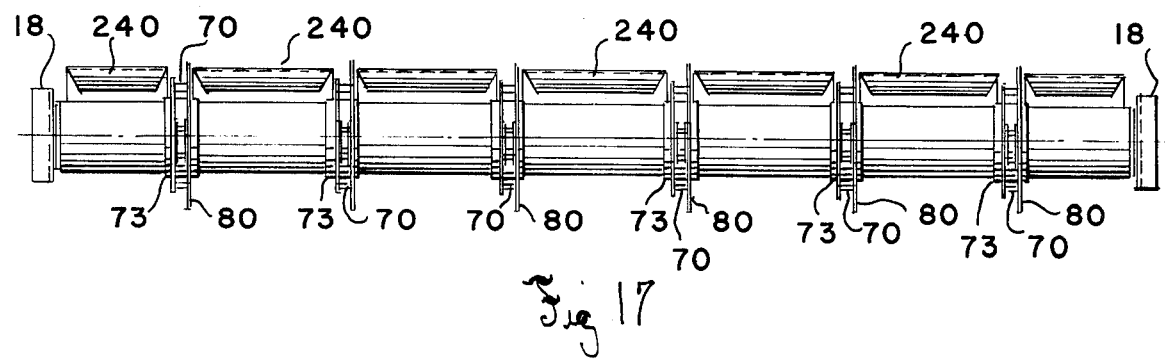
FIG. 17 is a rear elevation of the floor and lower apron support means of the machine.
Figure 18:
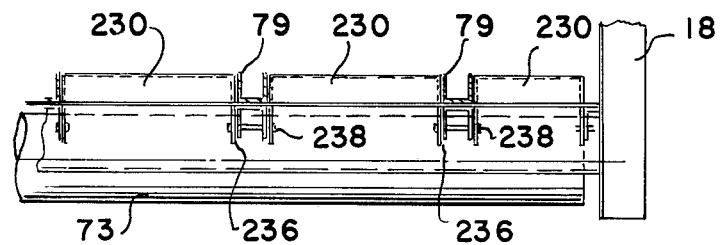
FIG. 18 is a slightly larger scale fragmentary sectional view of structure of FIG. 16 as seen on the line 18—18 thereof.

The lower apron is delivery means which comprises a series of endless, flexible chains 70, see FIG. 14, which are transversely spaced apart even distances and respectively extend around driving sprockets gears 72 on shaft 74 at the forward end of the bottom or floor 76 and circular guide surfaces 73 at the rearward end thereof on transverse supporting tube 83. The floor is rendered rigid and connected to frame 10 by a series of transversely extending bars 78, the opposite ends of which are suitably interconnected to the bottom horizontal members 12 of base frame 10 for example. The upper courses of the chains 70 preferably slide in channels 79 of wear-resistant material which are secured suitably to the bottom 76 for the full length thereof, as shown in FIG. 16 and 18, which are sufficient to guide the chains accurately in spaced relationship.

Figure 8:
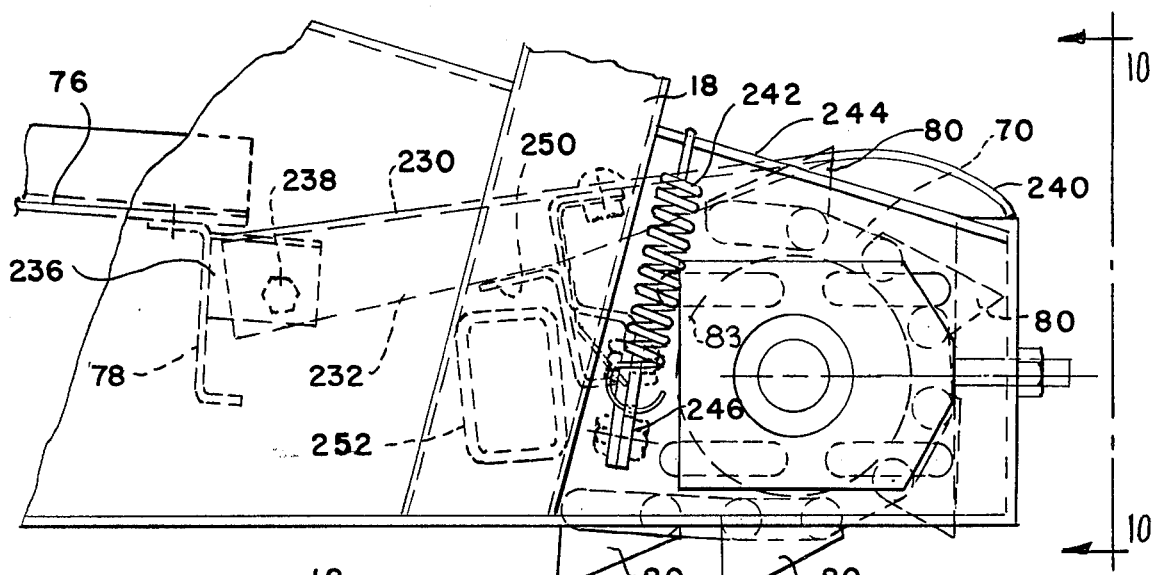
FIG. 8 is a fragmentary side elevation of the rear portion of the lower part of the machine, illustrated on a larger scale than in FIGS. 3–5, and showing details of the rearward end of the lower apron of the machine and the yieldable extremities of the floor or bed thereof.
Figure 9:
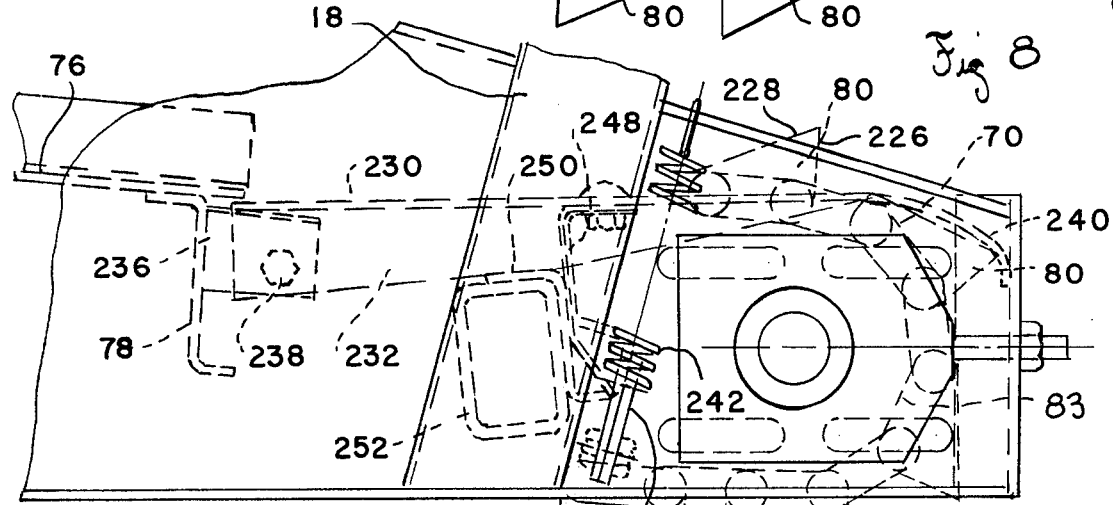
FIG. 9 is a view similar to FIG. 8 but illustrating the terminal ends of the floor or bed in depressed position to facilitate discharge of a roll from the machine.

Referring to FIGS. 8 and 9, it also will be seen that the alternate links of the chain 70 have what is termed aggressive lugs or blades 80 connected thereto. In view of the fact that the upper courses of the chains 70 move in the direction of the arrows shown in FIG. 8, it will be seen that the forward edge of the lugs or blades 80 extends substantially perpendicularly to the axis of the chain, and the upper edge of each lug or blade slopes rearward and downward. Such arrangement not only facilitates rotary movement of a roll of hay or the like in counter clockwise direction as viewed in FIGS. 1–3, but such engagement of the perpendicular forward edges of the lugs or blades 80 with the roll tends to dispose the stems and fibers of the forage material substantially circumferential, whereby there is a substantial tendency for the completed roll to shed rain and other inclement weather substances when lying in a field for example. Other details of the function of the lower apron and the discharge end of the bottom 76 are setforth hereinafter.

The upper frame 30 and certain guide rolls and sprockets which augment the same support the upper apron 82, which is shown in outline form in FIGS. 1–3. Said apron preferably comprises a pair of endless, flexible members which, preferably, are link-type chains 84, fragmentary examples of which are shown in FIGS. 4, 7, 14 and 15. At longitudinally spaced intervals of suitable dimension, such for example as of the order of eight or ten inches, a series of bars 86 extend between said chains for substantially the full width of the machine. The spaced apart bars 86, which extend between the pair of chains 84, are connected at their opposite ends respectively to correspondingly spaced, oppositely facing links 87 in the respective chains 86 such that the axes of the bars 86 are generally transversely aligned with the longitudinal centerlines of such connecting links 87, as seen in FIG. 14. Fragmentary examples of such bars are shown in FIGS. 7 and 15. In cross section, the bars may be square or any other suitable geometric shape, such as cylindrical, for purposes of offering resistance to bending of the bars, especially when engaging the periphery of a roll of hay 88, an example of which is shown in exemplary manner in FIG. 2. Said bars provide positive, aggressive engagement with the upper portion of the roll of hay and distribute pressure evenly across the roll from end to end. This is an important feature of the present invention to contribute to forming rolls of uniform density throughout.

Referring to FIGS. 4 and 5 in particular, it will be seen that, adjacent each side of upper frame 30, and spaced inwardly therefrom, is an arcuate bar 90 which is appropriately connected to the accurate frame member 34 at each side of the upper frame 30 by suitable brackets 92 and 94 respectively fixed to members 34 and bars 90, and bolted together as shown in FIGS. 4 and 5. The opposite edges of the arcuate bars 90 are rounded to strengthen the same and also minimize wear. The outer edge 96 is convex, and the inner edge 98 thereof is concave. Referring to FIGS. 1–3, the arcuate bars 90 are not shown but it will be understood that the same conform generally to the shape of the arcuate frame members 34 and the upper course of the chains 84 of upper apron 82 slideably engage the convex edge 96 of each of the arcuate guide bars 90.

At each side of the upper frame 30, adjacent opposite ends thereof, suitable guide sprockets 100 and 102 respectively are supported by clevises which are connected to the opposite ends of the arcuate member 34 at each side of the frame. Affixed to ends of shaft 104, which is supported in bearing brackets 42 adjacent the upper end of vertical frame members 14, are pairs of oppositely extending arms 106 and 108. Side arms respectively comprise take-up and expansion means for the upper apron 82 and operate as a pivoted supplemental frame. The ends of said arms support rotatable guide sprockets 110 and 112 adjacent the opposite ends of the arms and the chains 84 of the upper apron 82 extend therearound in the manner shown in FIGS. 1–3. Lastly, a driving sprocket 114 is provided at each side of the main frame and connected to a driven shaft 116 that is supported in appropriate bearings fixed relative to the main frame 10. The chains 84 of the upper apron 82 also extend around said driving sprockets. The lower course of the upper apron 82 also slideably extends over the upper curved surface of movably mounted auxiliary guide members 118, details of which are best shown in FIGS. 11–14 and are described hereinafter.

The pick-up header unit 56 is pivotally supported at its rearward end upon a shaft 120 which is rotatably supported at its opposite ends in bearings 122 connected to frame members 24 at opposite sides of the machine. The forward end of the pick-up header unit 56 is yieldably restrained against downward movement by a pair of springs 124 respectively connected at one end to the cross member 28 of the frame of the machine and, at the other end, being connected to end plates on the header 56 at opposite ends thereof. If desired, auxiliary wheels, not shown, may be rotatably mounted at opposite ends of the header unit 56 for engagement with the ground.

Upper compression roll 64 is supported by a shaft 126, the opposite ends of which are rotatable in bearings formed in arms 128, best shown in FIG. 6, the rearward end of said arms being supported upon pivot shafts 130 mounted in bearing brackets 132 which are fixed to vertical frame members 14. The opposite ends of arms 128 respectively at the opposite sides of the machine have clevises 134 connected thereto and a rod 136 extends upward from each clevis and is surrounded by a compression spring 138 which extends between each clevis 134 and a bracket 140 which is connected to a side plate 142 on each side of the machine.

DRIVE MECHANISM

As set forth above, power for the machine is derived from a p.t.o. of a tractor or the like, which is connected to shaft 52. Power output shaft 54 has a sprocket gear 144 connected to the outer end thereof as shown in FIGS. 6 and 7. Shaft 54 also extends beyond the outer end of sprocket gear 144 and has a large multiple sheave 146 fixed thereto. A sprocket chain 148 extends around sprocket gear 144 which comprises a driving sprocket. Chain 148, which is driven by sprocket gear 144 extends around idler sprocket gear 150 which is supported in a bearing on frame member 14. Chain 148 then extends around sprocket gear 152, another sprocket gear 154, and a further sprocket gear 156, from which the chain extends to the driving sprocket gear 144. Accordingly, all of the moving elements of the machine, with the exception of upper apron 82, are driven by the sprocket chain 148.

Another sprocket gear 158, of smaller diameter than sprocket gear 152, is fixed to one end of pivot shaft 130 for support thereby and a driven sprocket gear 160 is fixed to shaft 126 of the upper compression roller 64 to drive the same by means of a sprocket chain 162 which extends around the sprocket gears 158 and 160. The various vertical planes within which the pairs of driving and driven sprocket gears are located are best illustrated in FIG. 7.

Sprocket gear 156 is a driving gear for the smaller sprocket gear 164 which is connected to shaft 120 and is in the same plane as the larger driven sprocket gear 166. Sprocket chain 168 extends around the gears 164 and 166 and thereby effecting rotation of shaft 62 which drives the pick-up fingers of the header unit 56 which operate within in the circular slots 58 thereof.

The power output shaft 54 also supplies the power for driving the upper apron 82. This is accomplished by the multiple sheave 146 which is connected to the outer end of shaft 54, as indicated above, and a driven multiple sheave 170. A series of V-belts 172 extend around the multiple sheaves 146 and 170 in a loose condition, whereby the same comprise part of what may be considered a clutch arrangement. Multiple belt-tightening sheaves 174 are supported rotatably on the outer end of arm 176 which is pivoted at 178 to a bracket plate 180. A tension spring 182 is mounted in a manner to normally elevate the tightening sheaves 174 to inoperative position.

The purpose of the clutch-type arrangement described immediately above is to stop the movement of upper apron 82 when the upper frame 30 is moved to the elevated, discharge position thereof shown in FIG. 3. When this occurs however, the lower apron comprising the chains 70 continue to move in a direction to expel the completed roll 88 of hay or the like from the machine. Such continued movement of the lower apron is effected by driven sprocket 154 which is connected to the outer end of the shaft 74 which supports the sprocket gears 72 for the chains 70.

Operation of such clutch mechanism is effected by the position of the tightening sheaves 174 with respect to the belts 172. Movement of the arm 176 in a direction to cause the sheaves 182 to tighten the belts 172 is effected by a cable 184, one end of which is fixed to eyelet 186 on the forward end of lever 176 and the opposite end of the cable is connected to a short arm 188 which projects outwardly from the frame member 32 of upper frame 30, as best shown in FIGS. 1 and 3. If desired, a spring 190 of predetermined tension strength is connected between said other end of cable 184 and the arm 188, as shown in FIG. 3. By comparing FIGS. 1 and 3, it will be seen that in FIG. 1, the cable 184 is under tension by reason of the position of arm 188 on upper frame 30, whereby the tightening sheaves 174 are in tightening engagement with the belts 172 and thereby cause driving of the driven sheaves 170 by the driving sheaves 146, thus moving the upper apron 82 at a selectable predetermined speed which comprises an important feature of the present invention, as follows.

As described above, power from the p.t.o. of a tractor is connected to shaft 52 for transfer of said power to all moving elements of the machine which embodies the present invention. Referring particularly to FIGS. 6 and 7, it will be seen that shaft 52 drives shaft 54 to which the large multiple sheave 146 is connected to be driven thereby. V-belts 172 connect sheave 146 to multiple sheave 170 which drives shaft 116 upon which driving sprockets 114 are mounted at opposite ends for purposes of driving respectively the chains 84 of upper apron 82. All other moving elements of the machine, and especially the lower apron comprised of chains 70, in view of sprocket gear 144 also being mounted on shaft 54, are driven by said shaft 54, as shown in FIG. 6. Sprocket gear 144 drives sprocket chain 148 which, in addition to extending around various drive sprocket gears and idlers, also extends around sprocket gear 154 which is connected to one end of shaft 74 upon which driven sprockets 72 for chains 70, which form the lower apron, also are connected, as best shown in FIG. 14.

From the foregoing, it will be seen that the speeds of the upper and lower aprons are effected and controlled directly and, in particular, respectively by the sizes of sprockets 114 and 154, although the sizes of other sprockets and sheaves have a bearing upon the speeds thereof. For simplicity, however, it can be seen that by changing the sizes of the sprockets 114 and 154, the relative speeds of upper apron 82 may be varied relative to the lower apron consisting of chains 70. The relative speeds of said aprons are important in regard to producing, in particular, different operational characteristics of the machine and also effect the rolls of material produced, as follows.

It has been established from actual operation of the machine that when the lower apron is operated at a higher speed, such as of the order of 5 percent, than the upper apron, the roll being formed tends to be maintained toward the discharge end of the machine, within the space 196. Also, under such circumstances, such positioning is deemed to be advantageous to produce relatively uniform density in the roll being formed, as distinguished from the rolls formed by certain existing machines, especially those using a mechanical core, which tend to form cores which are much more dense than the outer portions of the rolls, whereby when such dense inner portions are reached by the animals eating the same, it is difficult to tear the material loose from the cores. Hence, such speed relationship has certain advantages but these must be considered relative to the situation where, when the aprons are operating at substantially the same speed, substantially less power is required.

When the lower apron is operated slower than the upper apron, it has been found that there is a reduced possibility of inadvertently discharging the processed roll of crop material from the rear end of the machine. Further, when the lower apron is operated at a slower speed than the upper apron, the crop material is forced to form in front of discharge end 196, thereby eliminating the advantages described above. Hence, resolving the foregoing factors to achieve the best results with greatest efficiency and economy, the preferred operation is that in which both aprons are operated at substantially the same speed, whereby power efficiency and the relatively uniform density throughout the roll are acceptable.

As shown in exemplary manner in FIG. 3, when the upper frame 30 is elevated to discharge position, the cable 184 becomes slack and the spring 182 raises the belttightening sheaves 174 to idle position, thus stopping the movement of the upper apron 82.

UPPER APRON EXPANDING MECHANISM

Reference is made to FIGS. 1 and 2 in which the starting and final positions of the upper apron 82 are illustrated to best advantage. When a roll of hay or the like is first initiated, the swath or windrow 60 of the material is delivered to the forward end of the lower apron comprising the chains 70. Referring to FIG. 1, it will be seen that the initial position of the lower course of the upper apron 82 extends over the auxiliary guide members 118 at opposite sides of the inner surfaces of the side plates 192 of the machine which extend between and are fixed to the vertical frame members 14, diagonal brace members 20, frame members 18 and horizontal bottom members 12, as well as between the angularly disposed frame members 22 and 24. Also, there are additional side plates 194 which extend across the major portion of the space defined by the frame members 32 and 34 of upper frame 30. Said side plates 192 and 194 confine the opposite ends of the roll 88 of hay or the like while it is being formed.

From FIG. 1, it will be seen that formation of the part of the roll of hay or the like occurs in a wedge shaped region or space 196 which is narrower at the forward end than at the rearward end and is defined at the top by the lower straight course of the upper apron 82 between sprockets 114 and auxiliary guide members 118, and the upper course of the lower apron comprising chains 70. The shape of this space has been arranged particularly to facilitate the commencement of the rolling of the material, especially in the narrower entrance end of the space 196, such rolling of the material occuring by virtue of the opposite directions in which the lower course of upper apron 82 and the upper courses of the chains 70 of the lower apron move, as illustrated by direction arrows shown in FIG. 1. When this occurs, the upper apron 82 is in an N-shaped, compactly contracted position. In this position, it will be seen that a substantial length of the apron which extends from sprockets 110, down and around sprockets 112 and up to sprockets 102 is disposed at least somewhat within the space ultimately occupied by the roll 88 of material which is confined by the circular configuration of the lower course of the upper apron 82, as illustrated in FIG. 2.

Movement of the upper apron 82 between the contracted, starting position shown in FIG. 1 and the expanded, final position shown in FIG. 2 is controlled by mechanism connected to the opposite ends of shaft 104 upon which ends the arms 106 and 108 are fixed. Such control mechanism comprises a pair of similar cam plates 198 that respectively are fixed to the opposite ends of shaft 104 and extend radially therefrom. A cable 200 is connected at one end to a pin 202 on the cam plates 198. From said pin, the cable extends around a guide pulley 204 which is supported on a bracket arm 206 that is fixed to the upper end of vertical frame 14. It will be understood that each of the members 14, at opposite sides of the machine, support a bracket arm 206 and guide pulley 204, as well as there being a cable 200 at each side of the machine. The other end of cable 200 is connected to one end of a very strong tension spring 208, the opposite end of said spring being anchored to a pin 210 on frame member 18 at each side of the machine. The arrangement just described results in the lower course of upper apron 82 exerting substantially constant pressure upon a coiled roll of hay or the like while it is increasing in size.

It is obvious from FIG. 2 that as the roll 88 increases in size, a greater extent of upper apron 82 engages the same and covers an area of increasing size to apply pressure thereto. The cam plates 198, cables and especially the extension of springs 208 operate to increase the pressure exerted by springs 208 but such increasing pressure is distributed by the upper apron over a greater area of the roll, whereby substantially constant unit pressure, areawise, is applied to the roll as it increases in size and this results in the roll having substantially uniform density throughout. Such results cannot be acheived by hydraulic means, as employed in U.S. Pat. No. 3,722,197, to Vermeer, without at least perhaps employing some sort of very sophisticated control valve system which is not disclosed in the arrangement of said patent.

As the roll of hay or the like increases in diameter due to the coiling thereof within the initial space 196 shown in FIG. 1, the lower course of upper apron 82 between sprockets 114 and guide members 118 will gradually be raised by the roll, with the result that the lower course of said apron will be lifted from the auxiliary guide members 118. As described hereinafter, said auxiliary guide members will be retracted into accommodating spaces 225 in the side plates of the machine so as not to interfere with the movement of the ends of the roll 88 of hay and the like which is being formed. Also, such upward movement of the lower course of the apron 88 will require an extension of the amount of such lower course which is in engagement with the upper surface of the roll 88 of material. Such expansion in said lower course is provided by counter-clockwise rotation of the arms 106 and 108, as viewed in FIGS. 1 and 2.

Said rotation of arms 106 and 108 is resisted by the springs 208 at opposite sides of the machine and this results in suitable compression force being applied to the roll 88 to render it uniformly compact for the reasons described above. Also, when the lower course of the upper apron 82 has reached its maximum expanded position, as illustrated in FIG. 2, the chains of said lower course will ride upon the concave edges of the arcuate guide bars 90 respectively fixed to the arcuate frame members 34 of upper frame 30, whereby said lower course of the upper apron will in no way interfere with the movement of the upper course of said apron, as can be clearly seen from FIG. 2 which is the position in which the upper and lower courses thereof will approach each other most closely.

Due to the tension constantly exerted by the springs 208 upon the arms 106 and 108 and especially upon the guide sprockets 110 and 112 respectively carried thereby, engagement of the chains of the upper apron 82 with the various guide sprockets for the same will be maintained at all times. Further, due to the fact that the chains at opposite sides of the upper apron 82 will mesh with the driving sprockets 114 respectively fixed to the opposite ends of shaft 116, there will be no tendency for variation occurring in the movements of the chains at opposite ends of the upper apron and thus the bars 86 of the upper apron will be maintained constantly parallel to the axes of the various shafts extending between opposite sides of the machine.

It also will be seen especially from FIGS. 1 and 2 that even though there is the possibility for the upper apron 82 to expand around a relatively large diameter of roll 88 of material, such as of the order of as much as 6 or 7 feet, it will be seen that at no time is the upper apron disposed in any outwardly extending position of great extent, whereby the disposition of said upper apron is substantially compact at all times.

Referring to FIGS. 11–14, wherein details of the auxiliary guide members 118 are illustrated, it will be seen that the members 118 have a rounded, arcuate upper surface 212 which is slideably engaged by the chains 84 of the upper apron 82. Normally, the members 118 are maintained in the extended position such as shown in FIG. 12. This position is maintained by a shaft 214 which is pivotally connected at one end to ear means 216 on member 118. A compression spring 218 surrounds the shaft 214 to normally urge the member 118 to projected position such as shown in FIG. 12. Spring 218 extends between a washer fixed to shaft 214 and a bracket 220 which is supported by a suitable angle member connected to the exterior surface of the side plates 192 at opposite sides of the machine. Member 118 also has a pair of parallel legs 222 which are pivotally supported by horizontal shaft 224 which is suitably connected to the side plate 192. Said side plate also has an appropriate opening 225 formed therein through which the member 118 moves to the retracted position shown in FIG. 13, against the compressive force of spring 218.

The members 118 at opposite sides of the machine are forced from the projected position of FIG. 12 to the retracted position of FIG. 13 by engagement of the members 118 by the opposite ends of the roll 88 of hay or the like. They also will be maintained in said retracted position as long as the roll 88 of hay or the like remains in the machine. However, after discharge of the roll, the springs 218 restore the members 118 to the projected, operative position such as shown in FIG. 12 in order that the lower course of the upper apron 82 may slideably engage the same for support incident to the apron 82 forming one boundary of the wedge shaped space 196.

DISCHARGE OPERATIONS

When the roll 88 of hay or the like has reached either a desired or maximum diameter capable of being formed by the machine, the operator of the tractor actuates a valve, not shown, to introduce fluid by conventional means to one end of the cylinder units 46 and thus effect raising of the upper frame 30 from the position shown in FIGS. 1 and 2 to the discharge position shown in FIG. 3. As described above, such movement releases the tightening sheaves 174 from the belts 172 and thus disconnects driving power from the upper apron 82. However, rearward movement of the upper courses of the chains 70 comprising the lower apron continues from the driving imparted to shaft 74 by sprocket gear 154.

Particularly in FIGS. 8 and 9, it will be seen that on alternate successive links of the chains 70, the lugs or blades 80 are provided to effect positive and aggressive engagement between the chains 70 and the lower surface of the roll 88 of the material being formed into a roll. During such formation, the roll will be rotated in the direction of the arrow illustrated in exemplary manner in FIG. 3. The shape of the lugs or teeth 80 also is important. They provide aggressive impingement upon the roll 88 and are much more aggressive in nature and action than the cross bars 86 of the upper apron 82. The lugs on the chains have a substantially perpendicular leading edge 226 and a downward and rearward sloping upper edge 228, considered relative to direction of movement of said lugs in the upper course of chains 70, as indicated by the directional arrows in FIG. 9. Not only is the function of the lugs 80 to firmly and aggressively impinge and dig into the lower surface of the roll 88 of material but the simultaneous concentrated engagement of all of the lugs 80 on all of the chains 70 with the lower surface of the roll 88 produces extensive circumferential orientation of the stems and fibers of the agriculture forage crops throughout the roll so that when the roll is left in a field for feeding of stock or the like, such rolls have a substantial tendency to shed rain and other inclement weather substances in a highly satisfactory manner.

Figure 10:
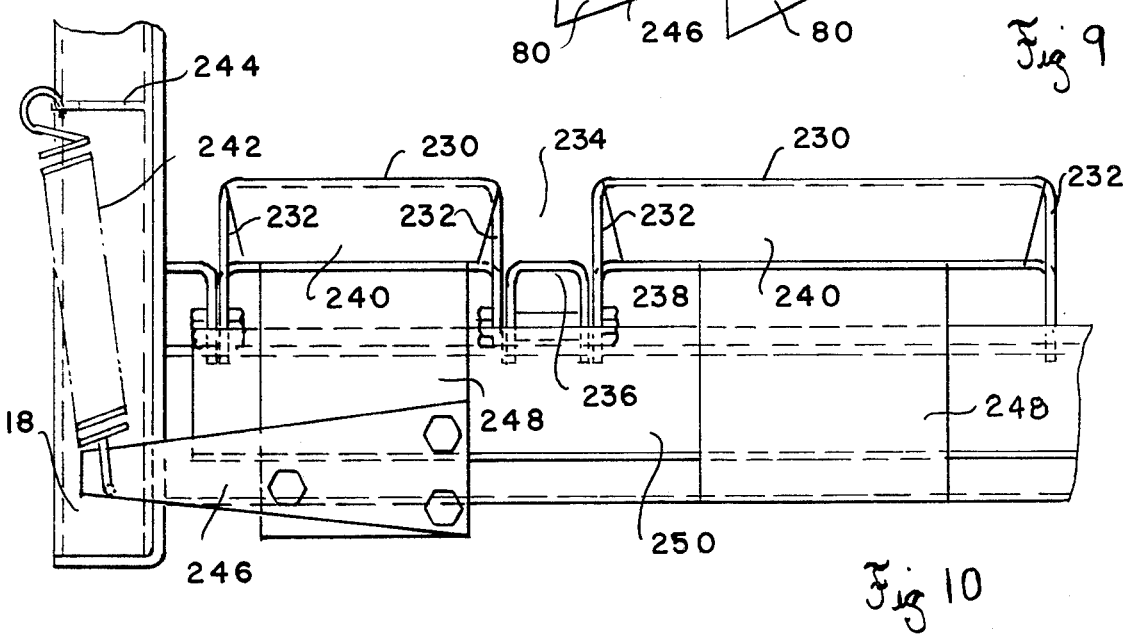
FIG. 10 is a fragmentary rear elevation of the portion of the machine shown in FIGS. 8 and 9 as seen on the line 10—10 of FIG. 8.

The discharge end of the bottom or bed 76 of the machine terminates in a series of similar plates 230 which have side flanges 232 extending downwardly. The side flanges of adjacent plates 230 are spaced apart even distances, as shown in FIG. 10. The spaces 234 thus formed are sufficiently wide to receive the chains 70, and the lugs 80 which project therefrom, when the other ends of the plates 230 are in the elevated position thereof shown in FIG. 8. Thus, the chains and the lugs 80 disappear through said spaces and this results in the lugs disengaging the roll of material which is being rotated clockwise, relative to FIGS. 1–3, while the lower surface of the roll slides in a rearward direction with respect to the stationary bottom or floor 76 of the machine.

The innermost or forward ends of the plates 230 are pivotally connected to U-shaped brackets 236 which are welded to and extend outwardly from one of the transverse bars 78 which supports the floor 76, as shown in FIGS. 8 and 9. Bolts 238 effect such connection. The outer ends 240 of plates 230 curve downwardly as clearly seen in FIGS. 8 and 9 and said ends are normally maintained in elevated position by a pair of tension springs 242 which respectively are mounted at opposite sides of the machine. The upper ends of the springs engage a flange 244 extending along each side of the machine and the lower ends of the springs engage an arm 246 which is rigidly fixed to a downwardly extending bracket 248 which is connected to the outermost plates 230 at opposite sides of the machine. All of the plates 230 are connected together to move in unison by a transversely extending Z-bar 250 which underlies and is connected to the lower edges of all of the side flanges 232 of plates 230. Downward movement of the plates 230 is limited by engagement of the uppermost flange of the Z-bar 250 with a transversely extending frame tube 252 which extends between opposite sides of the machine and the ends of said tube are firmly connected to the frame members 18 thereof.

At the time a roll 88 of forage material has been formed to desired or maximum diameter and is to be discharged from the machine, following the elevation of the upper frame 30 which disengages the upper apron 82 from the roll, the continued rearward movement of the upper courses of the chains 70 will carry the roll rearward and onto the plates 230. The weight of the roll will be sufficient under such circumstances to overcome the force of the springs 242 and thus depress the outer ends of the plates 230 to the retracted position shown in FIG. 9. This results in the teeth 80 of the chains 70 being exposed to a substantial distance above the surfaces of the plates 230 and thereby enables the lugs to very aggressively engage the lower surfaces of the formed roll and move it rearwardly for final discharge from the machine. When this has been accomplished, springs 242 will immediately restore the plates 230 to the normal, elevated position of the rear ends 240 thereof.

For safety and protection, the upper frame 30 also is provided with outer cover plates 254 which at least partially extend around and between the arcuate frame members 34 of upper frame 30.

In addition to the important feature of the relative speeds at which the lower and upper aprons are operated, as described hereinabove, another important feature of the invention resides in the more aggressive impingement of the roll-engaging lugs on the lower paron than the impingement afforded by the cross bars 86 of upper apron 82. The lugs 80 on chains 70 positively dig into the lower surface of the roll of hay or the like being formed and move it continuously rearwardly, toward the discharge end of the machine, while the bars 86 of the upper apron 82 engage a substantial segment of the upper cylindrical surface of the roll of hay or the like and effect a certain amount of impingement therewith to positively move said upper surface forwardly, thus rotating the roll within the machine about an axis transverse thereto. Due to the weight of the roll, however, it has been found necessary to provide a more aggressive impinging engagement between the lower apron and the roll than between the upper apron and the roll. Such difference in engagement is effectively provided by the particular structures of the two different aprons described in detail hereinabove.

In addition to the foregoing functions of the upper and lower aprons, the lugs 80 of the lower apron also circumferentially orient the stems and fibers of the forage material to enhance the shedding of rain and the like when lying in a field, and the bars 86 of the upper apron 82 effectively exert pressure upon the roll being formed and thereby compress the same relatively uniformly to form a final roll of forage material having a substantially uniform density which is relatively compact but not too compact to be easily removed by animals feeding on the same, even the innermost core portions of the rolls.

From the foregoing, it will be seen that the present invention provides a highly versatile machine for forming large sizes of compact rolls of agriculture forage material such as hay and other similar crops. The rolls are formed while out of contact with the ground, thus minimizing waste of the material being harvested and also keeping the rolls in reasonably clean condition and relatively free from dirt, stones and other undesirable material which may occur in fields from which the crop is being harvested. All moving elements of the machine are power driven in a manner which achieves maximum efficiency. Further, the upper apron is arranged and supported by mechanism which permits substantial expansion of the lower course of the apron which engages the roll being formed, the contracted portion of said apron from which the expanded lower course is obtained being disposed to a substantial extent within the space ultimately occupied by the enlarged roll of material, thus minimizing the overall size of the machine. The expansion also takes place automatically, under tension which is uniformly applied to the upper surface of the roll being formed substantially from the time the roll is initiated until its ultimate size is reached and the relative speeds of the upper and lower aprons may be arranged for maximum efficiency, as well as the more aggressive nature of the lower apron affording certain advantages fully set forth above.

While the invention has been described and illustrated in its several preferred embodiments, it should be understood that the invention is not to be limited to the precise details herein illustrated and described since the same may be carried out in other ways falling within the scope of the invention as illustrated and described.

We claim:

1. A machine for forming a roll of crop material, comprising in combination:
   a. a mobile frame adapted to travel across a field;
   b. material delivery means supported by said frame;
   c. endless flexible members supported by said frame and mounted above said delivery means;
   d. means extending transversely between and interconnecting said endless flexible members;
   e. said delivery means together with said flexible members and said transverse means interconnecting said members defining a roll forming region extending between opposite sides of said frame;
   f. means to drive at least a portion of said delivery means in a predetermined direction to deliver crop material from the field to said roll forming region and also drive said flexible members for movement in a direction opposite to that of said portion of said delivery means; and
   g. said transverse means which interconnect said flexible members also extending transversely across said delivery means for engagement with the upper surface portions of said crop material being delivered to said region and in cooperation with said delivery means for applying pressure to said crop material to effect positive rotating movement of said material and form it into a roll.

2. The machine according to claim 1 wherein said transverse means which extend between and interconnect said flexible members is generally transversely aligned with the longitudinal centerlines of said flexible members.

3. The machine according to claim 1 in which said transversely extending means interconnecting said endless flexible members comprise a series of similar elongated members spaced apart longitudinally along said flexible members and adapted to afford positive engagement with said upper surface portions of said crop material as formed into a roll in said machine to effect said positive rotation of said roll while the lower portion thereof is in engagement with said delivery means and cooperative therewith to effect said positive rotation of said roll unidirectionally, said elongated members being relatively rigid and operable to evenly compress said roll of material across substantially the full length thereof.

4. The machine according to claim 3 in which said mobile frame has opposite sides and said material delivery means comprises endless flexible means supported for movement of the upper span thereof in said predetermined direction, and said endless flexible means being disposed between said opposite sides of said frame and defining the lower boundary of said roll forming region.

5. The machine according to claim 4 further including a floor fixedly supported by said frame and said upper span of said endless flexible means being supported by said floor for movement of said span longitudinally of said frame between the opposite ends of said floor, whereby said floor supports a roll of crop material while being formed out of contact with the surface of a field.

6. The machine according to claim 5 in which said endless flexible means have projections thereon to effect positive frictional engagement with the lower portion of a roll of crop material in cooperation with engagement of the upper portion of said roll by said interconnecting elongated members carried by said endless flexible members.

7. The machine according to claim 6 in which said projections on said endless flexible means are of a construction to provide more aggressive engagement with the roll of material than the transverse interconnecting elongated members extending between said endless flexible members and comprising an upper apron, said projections thereby affording adequate driving power to overcome the frictional drag resulting from a roll of crop material engaging said floor while being rotated.

8. The machine according to claim 4 in which said endless flexible means comprise a series of endless chains spaced apart transversely across said floor and said floor having guide channels in which the upper spans of said chains slidably move.

9. The machine according to claim 8 further including shaft means carried by said frame adjacent opposite ends of said floor and a plurality of pairs of sprocket gears respectively mounted on said shaft means and opposite pairs thereof respectively receiving said chains therearound to support said chains, and said drive being operable to drive said chains through connection to said shaft means for said sprocket gears which are positioned adjacent one end of said floor.

10. The machine according to claim 1 in which said endless flexible members comprise chains and said means extending transversely between and interconnecting said endless flexible members comprise elongated bars connected at the ends thereof to said chains to form an upper apron, and said machine further including shaft means supported by said frame and sprocket gears supported by said shaft means adjacent opposite sides of said frame of said machine above said material delivery means, certain of said sprocket gears being idlers and one of said gears adjacent each side of said machine respectively being fixed to the opposite ends of one of said shaft means extending between said opposite sides of said machine, and said drive means is connected to said shaft means to drive said chains simultaneously in unison and also thereby prevent skewing of said bars.

11. The machine according to claim 10 further including supporting means for certain of said idler sprocket gears for said upper apron, said supporting means being movable within the machine to dispose sections of said upper apron in compact contracted arrangement from which the lower span of said upper apron expands as the diameter of a roll of forage material expands during formation thereof, and means operable upon said supporting means to resist expansion of said lower span of said upper apron and thereby cause the same to impart pressure upon the upper surface of said roll and force the bars of said upper apron positively against said upper surface to compress said roll and effect movement thereof toward the forward end of said machine in opposition to the movement of the lower surface of said roll by said material delivery means toward the rearward end of said machine.

12. The machine according to claim 1 in which said material delivery means comprises a lower apron and said endless flexible members and means extending between and connecting the same comprise an upper apron, and said drive means includes separate components for driving said lower and upper aprons, said separate drive components being adapted respectively to be adjusted relatively to each other to move said lower and upper aprons at desired relative linear speeds to provide maximum efficiency in power consumption to drive the same relative to the resulting degree of relatively uniform density throughout the rolls formed within the machine.

13. The machine according to claim 12 in which said desired relative linear speeds of said lower and upper aprons are substantially equal.

14. The machine according to claim 12 in which the speed of said lower apron is arranged to be substantially no more than five percent greater than that of said upper apron while requiring greater overall driving power but effecting greater uniformity of density in said rolls produced than if said speeds were substantially equal.

15. The machine according to claim 1 in which said material delivery means comprises an endless lower apron and said endless flexible members and means extending between and interconnecting the same comprise endless chains spaced transversely apart and bars extending between and connected at the ends thereof to said chains to constitute an endless upper apron, said lower apron having aggressive projecting means thereon and said bars on said upper apron comprise aggressive projecting means, said aggressive means respectively being engageable with the upper and lower portions of a roll of crop material, said machine also including an upper frame movably connected at one end to said frame means of the machine, said upper frame having guide means for said chains of said upper apron to support the lower span thereof for movement in the opposite direction from the movement of the upper span of said lower apron, the rearward end of said upper frame extending downwardly into relatively close proximity to the rearward end of the lower apron to position the portion of the upper apron carried thereby to obstruct discharge movement of a roll of forage material from said lower apron when being formed within said machine and thereby resisting any tendency of the lower apron to move said roll toward the discharge end of said lower apron during formation of said roll in the machine.

16. The machine according to claim 15 further including power means connected to said upper frame, upwardly extending members on said frame means of said machine, and said upper frame being pivotally connected at the forward end thereof to said upwardly extending members, said power means being operable when a roll of forage material has been formed to a desired diameter to raise from obstructing position the downwardly extending rear end of said upper frame and the portion of the upper apron carried thereby to permit the continued rearward movement of the upper course of the lower apron to discharge said roll from the machine.

17. A machine for forming a roll of crop material comprising in combination, a. a mobile frame adapted to travel across a field,
b. a floor connected fixedly to said frame and adapted to receive a swath of crop material to be formed into a roll,
c. conveying means movable in a predetermined direction relative to said floor and adapted to convey said material along said floor in said direction,
d. endless flexible members movably supported by said frame respectively adjacent opposite sides thereof and above said conveying means for movement in a direction opposite that of said conveying means, and
e. means interconnecting said endless flexible members and extending transversely across said conveying means for compressing and driving engagement with said material in cooperation with said conveying means to effect positive rotation of said material and form it into a roll.

18. The machine according to claim 17 in which said conveying means comprise a series of endless chains spaced apart transversely to said direction of movement thereof and having projecting lugs thereon and constituting a lower apron, and said means interconnecting said endless flexible members comprising a series of bars extending between said endless flexible members and connected thereto in spaced relationship to each other to form an upper apron aggressively engageable with the upper portion of a roll of material in opposition to the aggressive engagement thereof by the lugs on the lower apron, said bars extending across the roll of material for the full length thereof and compressively engaging the upper portion of said roll evenly throughout the length of it while the projections on the lower apron effect circumferential orientation of the fibers of material in said roll.

* * * * *